United States Patent [19]

Ho

[11] Patent Number: 5,094,221
[45] Date of Patent: Mar. 10, 1992

[54] PORTABLE RADIANT GAS GRILL

[76] Inventor: Ying K. Ho, No. 22, Alley 18, Lane 75, An Ping Road, Tainan, Taiwan

[21] Appl. No.: 774,323

[22] Filed: Oct. 10, 1991

[51] Int. Cl.$^5$ .............................. F24C 1/14
[52] U.S. Cl. ........................ 126/4; 126/41 R; 126/92 AC
[58] Field of Search ............... 126/41 R, 92 B, 92 R, 126/92 AC, 92 C, 4, 38, 39 L, 44, 91 R, 86, 95, 37 B, 305; 431/328, 329

[56] References Cited

U.S. PATENT DOCUMENTS

| | | | |
|---|---|---|---|
| 2,515,035 | 7/1950 | Fernly | 126/41 |
| 2,631,216 | 3/1953 | Ames | 126/41 |
| 2,694,392 | 11/1954 | Oatley | 126/41 |
| 2,832,331 | 4/1958 | Schwank | 126/41 |
| 3,103,160 | 9/1963 | Forniti et al. | 126/41 |
| 3,139,879 | 7/1964 | Bauer et al. | 126/4 |
| 3,280,813 | 10/1966 | Schaenzer | 126/4 |
| 3,547,097 | 12/1970 | Rice | 126/92 R |

Primary Examiner—James C. Yeung
Attorney, Agent, or Firm—Bacon & Thomas

[57] ABSTRACT

A portable grill is provided which includes a casing for pivotably supporting a radiant heat gas burner therein, and a collapsible stand for supporting the casing and a tray under the casing. The burner may be turned and locked either in an up-faced position to perform ordinary cooking and heating functions or a reverse, down-faced position for grilling purpose.

1 Claim, 7 Drawing Sheets

5,094,221

PORTABLE RADIANT GAS GRILL

FIELD OF THE INVENTION

This invention relates to a portable grill.

BACKGROUND OF THE INVENTION

Outdoor gas and charcoal grills are very popular devices and it is very often highly desirable that such grills be portable. U.S. Pat. No. 4,492,215 to DiGianvittorio discloses an outdoor portable charcoal gas grill which includes a housing having a base for supporting a burner, a pair of spaced apart front and rear walls and side walls, each wall in each pair of walls being releasably interlocked with each associated wall of the other pair of walls, at least one of the walls being detachably mountable to the base, a cover hingeably attachable to one of the walls and a collapsible stand for supporting the erected grill housing.

The portable grill so constructed can be quickly and simply assembled and disassembled to enable compact and convenient transportation and storage of the grill and can also be assembled and disassembled by hand without screws, bolts, nuts or similar means of attachment. Yet this device is designed for outdoor use only, and may be frequently used during warm weather seasons or so called the "barbecuing season". There is a need, therefore, for a multi-functional grill to be used for all year round. For example, a portable grill for outdoor use during warm seasons and for indoor use as a heater during cold seasons and so on.

OBJECTS OF THE INVENTION

It is therefore an object of the present invention to provide an improved portable radiant gas grill which may be quickly and simply assembled and disassembled to enable compact and convenient transportation or storage of the grill;

It is a further object of the present invention to provide a portable radiant gas grill which may be used as a burner for indoor and outdoor cooking;

It is a further object of the present invention to provide a portable radiant gas grill which may be used as a heater during cold weather seasons.

DETAILED DESCRIPTION OF THE PREFERRED EMBODIMENT

Figure 1:
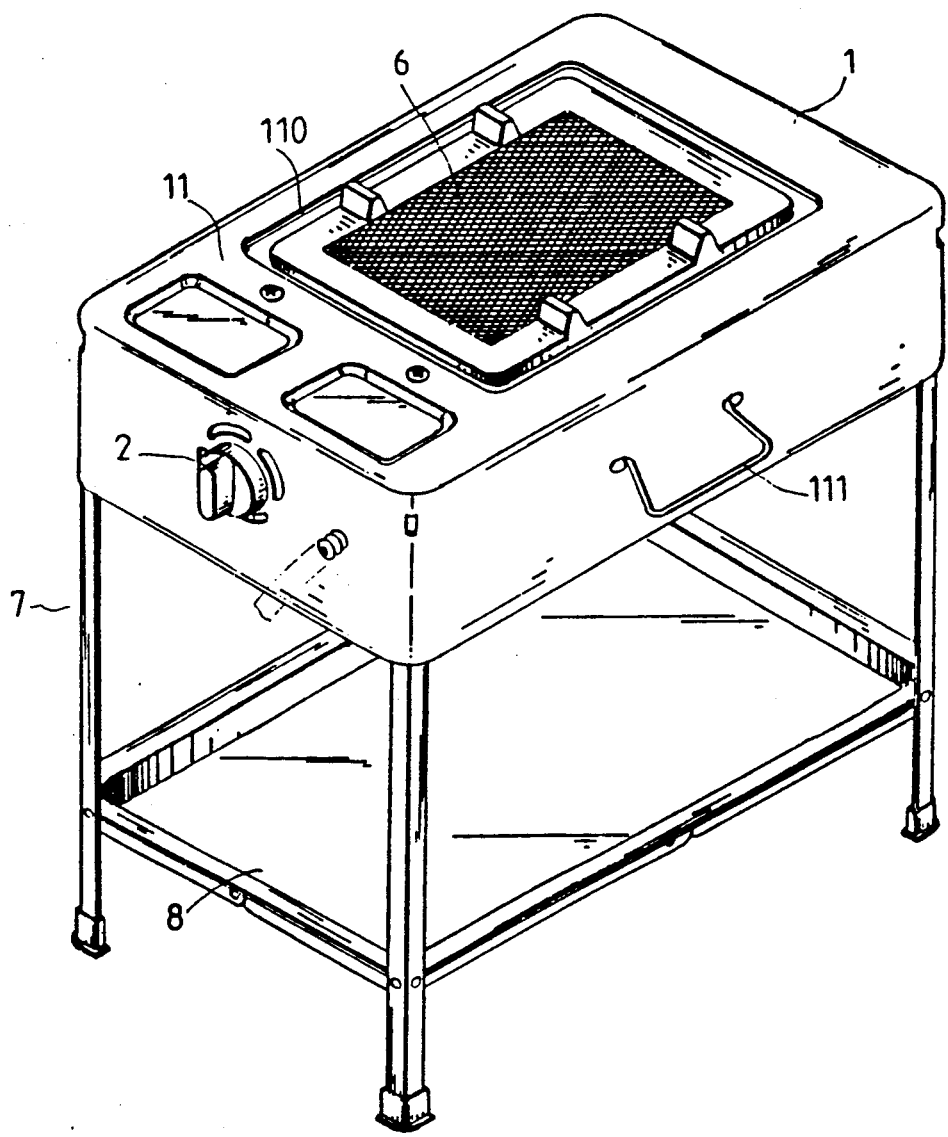
FIG. 1 is a perspective view of a preferred embodiment according to the present invention.
Figure 9:
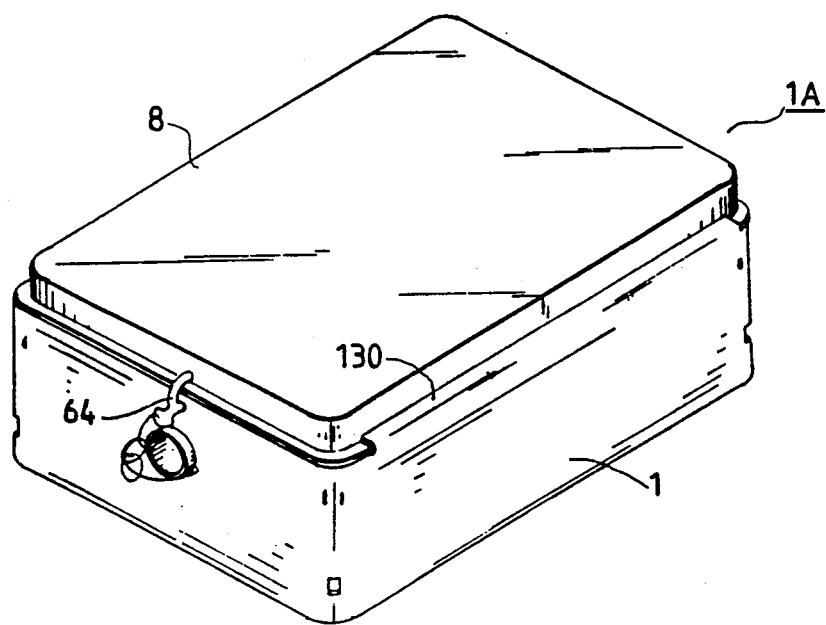
FIG. 9 is an axonometric view of the preferred embodiment in a collapsed condition ready for transportation or storage.

Referring now to FIG. 1, there is shown a portable radiant gas grill which features a housing 1 for supporting a radiant gas burner 6, a knob 2 for controlling the radiant burner 6, a handle 111 mounted to the front of the housing 1 for carrying the housing of FIG. 9 and a collapsible stand 7 for detachably supporting the housing 1 and a tray 8 under the housing 1.

Figure 2:
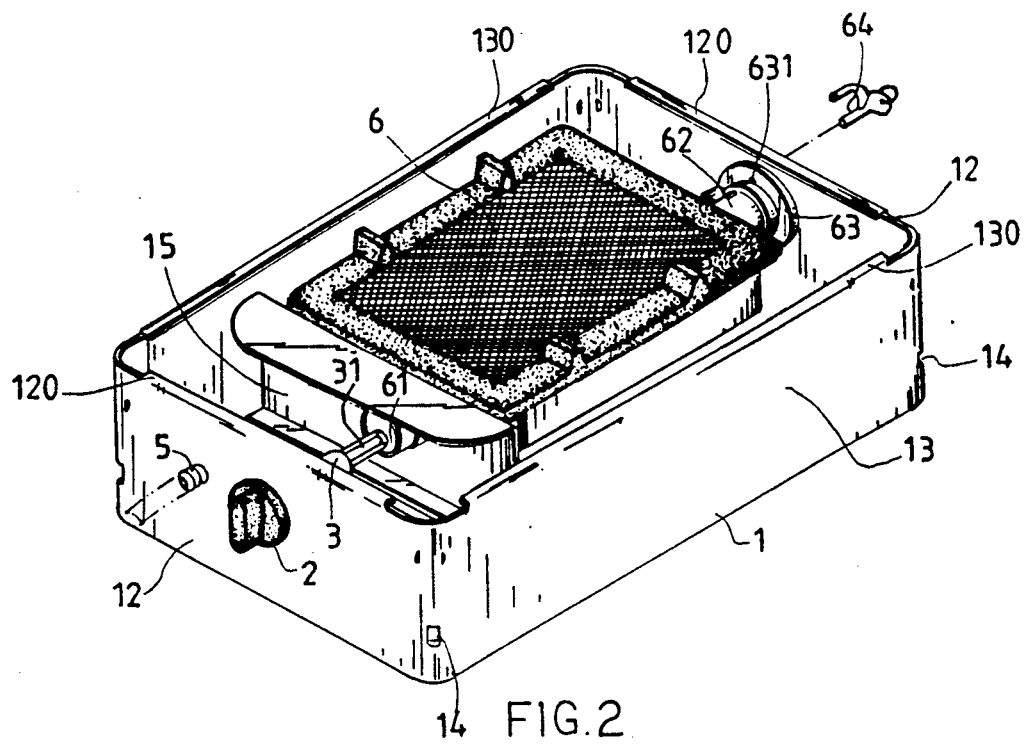
FIG. 2 is a perspective view of a housing of the preferred embodiment shown in FIG. 1 and a radiant gas burner supported in the housing.
Figure 3:
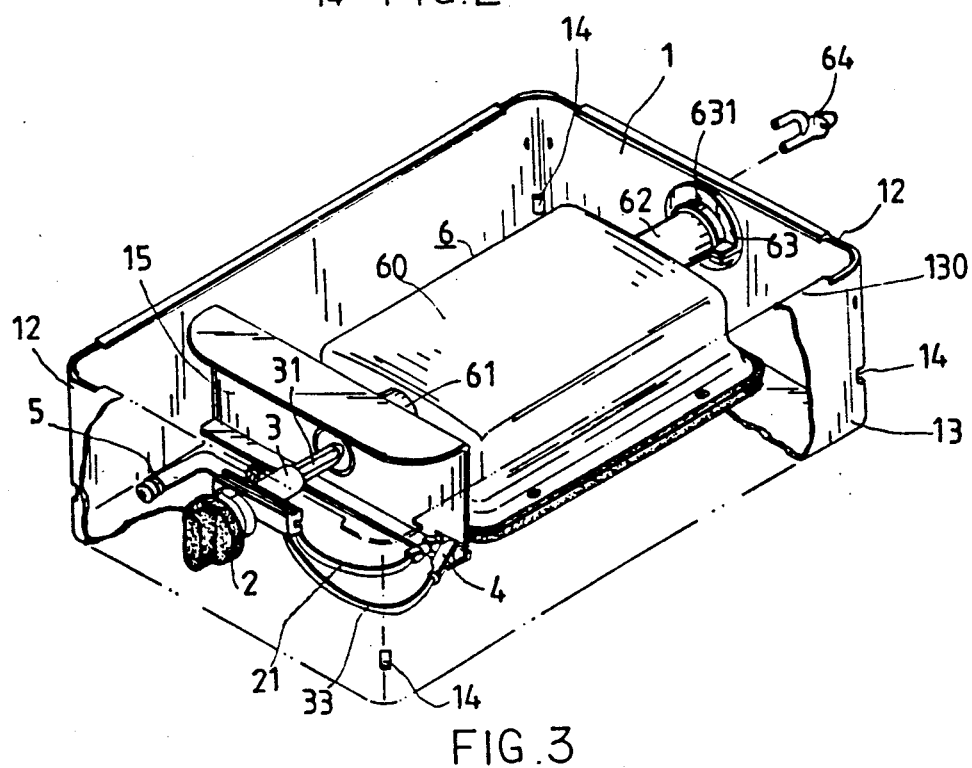
FIG. 3 is a perspective view of the housing shown in FIG. 2 with the housing partially broken and the radiant gas burner turned up-side-down.

Referring to FIGS. 2 and 3, the housing 1 hereof is positioned in an up-side-down state and includes a pair of front and rear side walls 12, a pair of spaced apart side walls 13 and a top wall 11, as shown in FIG. 1, formed with an opening 110 in a major portion of the top wall 11 to expose the radiant gas burner 6. All of the side walls 12, 13 have respective lip members 120, 130 bent inwardly from the bottom edges thereof for the purpose to be explained later. A bracket member 15 is attached to the bottom of the top wall 11 of the housing 1 adjacent an edge of the top wall opening 110 and spaced from the side wall 12 of the housing 1.

Figure 10:
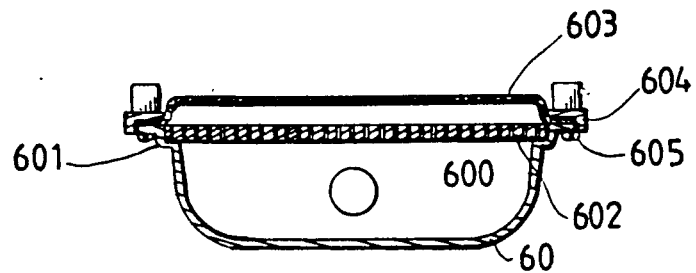
FIG. 10 is a cross-sectional view of the radiant gas burner.

The radiant burner 6, as best shown in FIG. 10, includes a housing 60 having an open top and an outer flange 601 along the open top and defining a gas distribution chamber 600, an inlet 61 for introducing a mixture of gas and air to the gas distribution chamber 600, a porous gas injection block 602 formed of a ceramic honeycomb and mounted to the open top of the housing 60, a wire screen or grill 603 laying on top of the gas injection block 602 and a frame member 604 mounted from top onto the outer flange 601 of the housing 60 to secure the wire screw 603 and the porous gas injection block 601 in position with screws 605.

Referring again to FIGS. 2 and 3, the inlet 61 is a tubular member extending outwardly from the interior of one of a pair of opposite side walls of the housing 60 of the radiant gas burner 6 to communicate the gas distribution chamber 600 and exterior of the housing 60. The tubular member 61 extends through an opening located in the bracket 15 and turnably mounted thereon to support the radiant gas burner 6 in the housing 1. A cylindrical bar 62 extends from the other one of the opposite side walls of the housing 60 along a direction opposite to the inlet 61 to pass through an opening located in the side wall 12 of the housing 1. Said cylindrical bar 62 is turnably mounted to the side wall 12 in corporation with the inlet 61 to turnably support the radiant gas burner 60 within the housing 1. A flange 63 is rigidly sleeved on the cylindrical bar 62 adjacent the side wall 12 of the housing 1. Said flange 63 is diametrically formed with two openings 631 so as to lock the radiant gas burner 6 either in an upward or normal position, as shown in FIG. 3, or a reverse position, as shown in FIG. 2, with a pin 64.

The radiant gas burner 6 further includes a control device 3 which includes a gas nozzle 31 pointing to the inlet opening of the inlet 61 and a control knob 2 for regulating the gas flow rate between a range of close and full open of a gas led through a joint 5.

Figure 4:
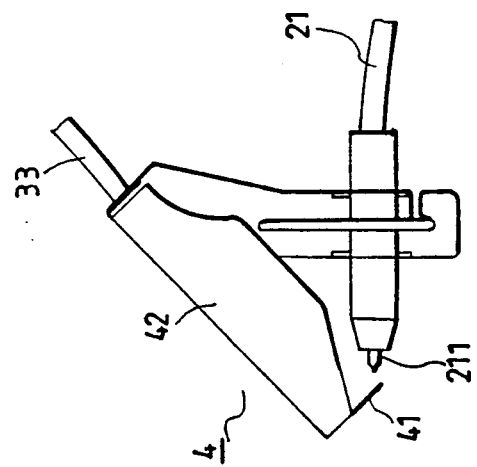
FIG. 4 is an enlarged elevation of an ignition device to be used in the embodiment of the present invention.

The radiant gas burner 6 further includes an ignition device 4. Said ignition device 4, as best shown in FIG. 4, includes a gas branch conduit 33 leading from the joint 5, a sheltering cover 42 sheltering the outlet end of the gas branch conduit 33 and having a reflection plate 41 slightly spaced from a plug 211 so as to generate sparks to ignite the gas discharged from the gas branch conduit 33 to light a seed fire, and the burner 6 will be lit by the seed fire to produce a flame. The plug 211 is led to a battery or a proper electrical power source through a wire 21.

Also shown in FIGS. 2 and 3, four corners of the housing 1 are respectively formed with hook-like members 14 so as to firmly receive top ends of the legs of the stand 7 when the housing 1 is mounted on the stand 7.

Figure 5:
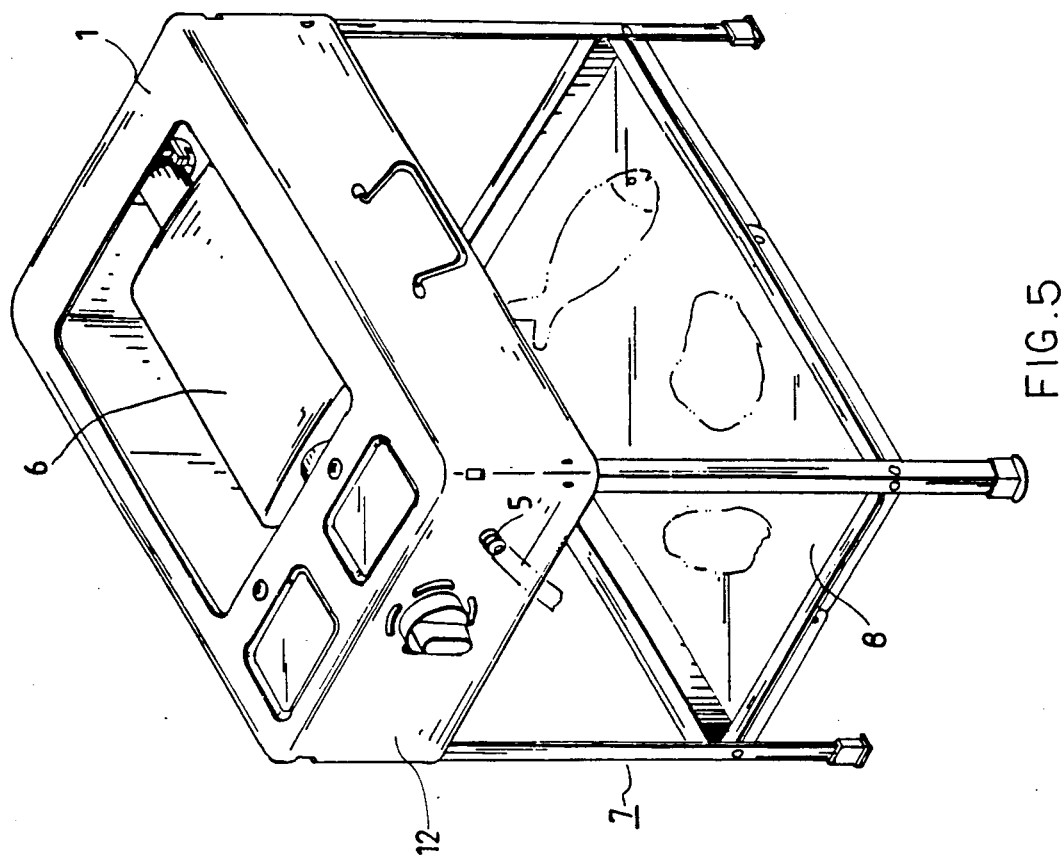
FIGS. 5 & 6 are diagramatically perspective views of the preferred embodiment showing the radiant gas burner turned and locked in its up-side-down position for grilling.

Referring to FIG. 5, the joint 5 protrudes from an opening of a side wall 12 of the housing 1. Gas fuel supply (not shown) is led to the burner 6 through a conduit connected to the joint 5. The tray 8 is supported by brace elements of the stand 7 at an elevation above the ground and under the housing 1 for loading foods, such as fish, meat and so on, to be cooked and the burner 6 is locked in its reverse position.

Figure 6:
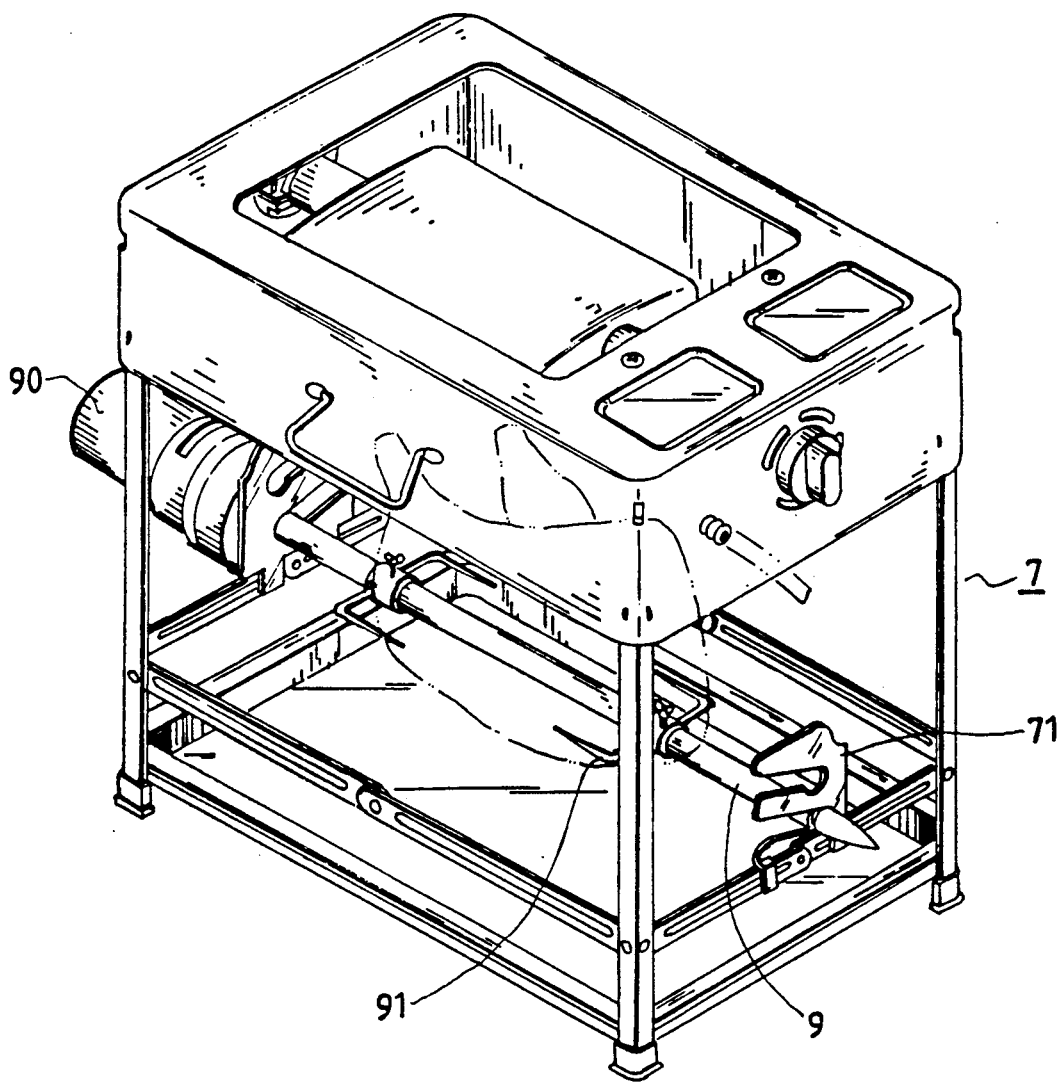

Referring to FIG. 6, a pair of bracket members 71 can be mounted on a pair of opposed brace elements of the stand 7. Said bracket members 71 are formed with slots for turnably supporting a spear member 9. Forks 91 are mounted onto the spear member 9 for retaining foods to be cooked. A transmission device 90 is attached to an end of the spear member 9 for driving the spear member 9 to rotate at a proper speed by a motor and a reduction gear set (not shown).

Figure 7:
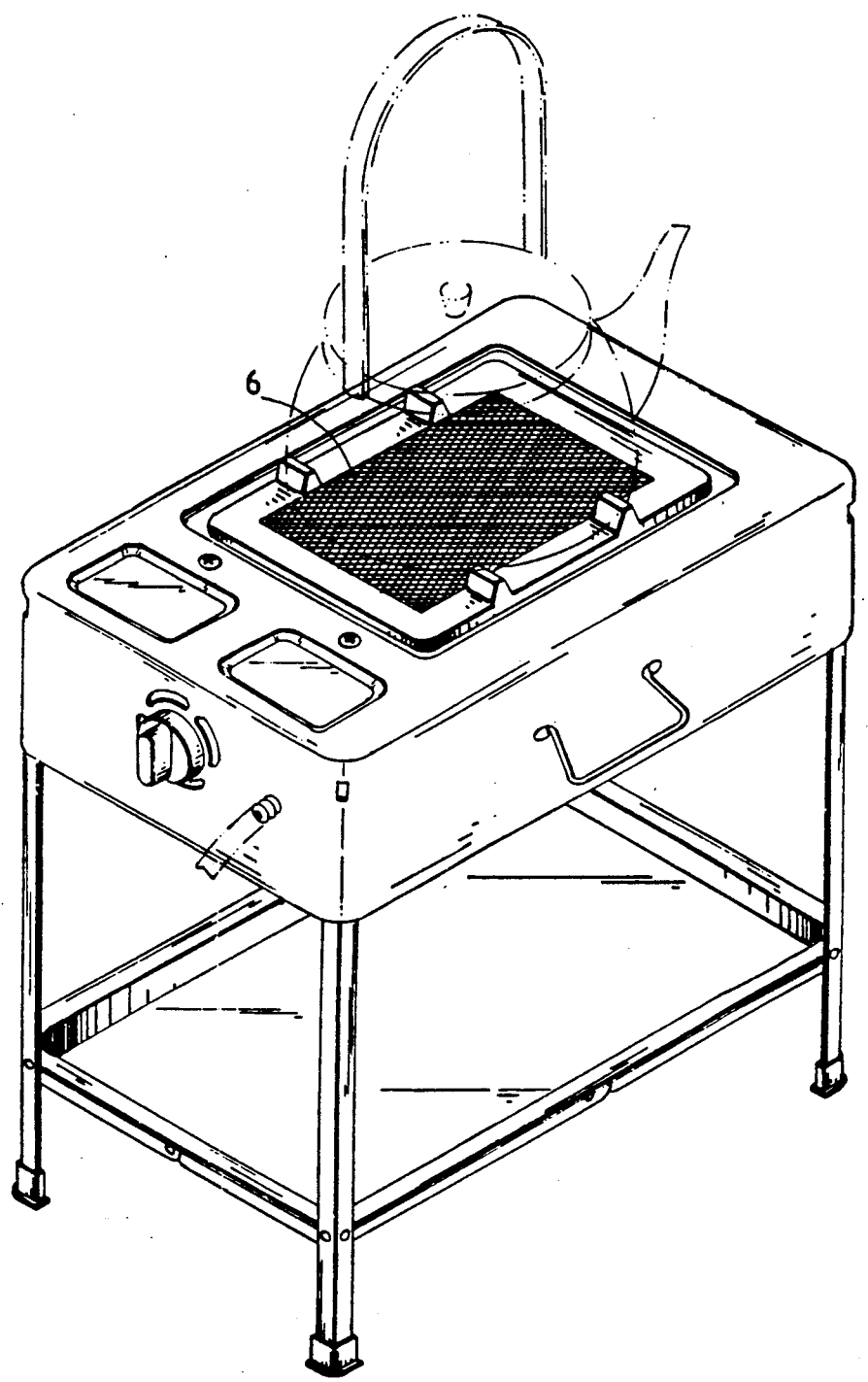
FIG. 7 is a diagramatically perspective view of the preferred embodiment showing the radiant gas burner locating in its normal position for heating a tea-kettle.

Referring to FIG. 7, the burner 6 can be locked in its normal position to function as an ordinary burner for cooking, heating or other use.

Figure 8:
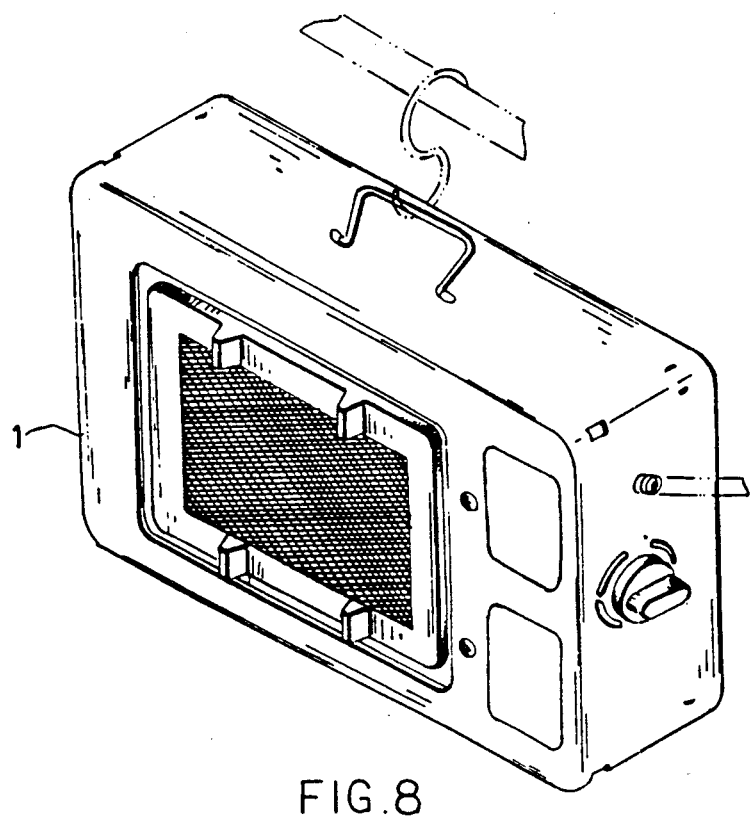
FIG. 8 is a diagramatically perspective view showing the housing of the preferred embodiment hooked on a proper high position to function as a heater.

Referring to FIG. 8, the stand 7 can be detached from the housing 1 and the housing 1 can be hooked on a wall or other proper position to function as a heater during the cold weather seasons.

Figure 11:
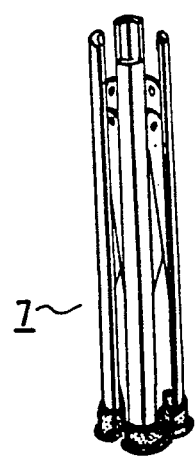
FIG. 11 is a perspective view of the collapsible stand in collapsed condition.

Grill 1 is disassembled simply by removing the stand 7 which can be collapsed, as shown in FIG. 11, and stored within the housing 1, then the tray 8 can be slid along the pair of lip members 130 to be engaged under the housing 1 and enclose the open bottom of the housing 1 for accommodating the collapsed stand 7 within the housing 1. The pin 64 has a first pin to lock the burner 6 in either of the two positions as mentioned above and a second pin to retain the tray 8 in its engaged position so as to provide a portable housing 1A, shown in FIG. 9, which enables convenient and compact storage.

What is claimed is:

1. A portable radiant gas burner comprising:
    a casing having a pair of spaced apart front and rear walls and a pair of spaced apart side walls defining four corners therein and a top wall formed with an opening in a major portion of the top wall;
    a handle mounted to the front wall of the casing;
    a support plate suspended from a bottom of the top wall and spaced away from either one of the side walls of the casing;
    a plurality of hook-shaped fasteners formed in the four corners of the casing with openings thereof extending downwardly;
    a radiant gas burner having a vessel-shaped housing defining a gas distribution chamber and a major open side, a gas inlet made of a tubular member having an internal passageway extending through a side wall into the housing to communicate the gas distribution chamber and exterior of the housing, said tubular member extending through an opening in the support plate for pivotably supporting a first end of the housing, a porous gas injection block made of a ceramic honeycomb and mounted to the open side of the housing, a wire screen mounted on top of the gas injection block and a frame member secured to margins of the wire screen to keep the wire screen and gas injection block in position between the frame member and housing to form a burning zone, and a cylindrical bar extending from a side wall along a direction opposite to the gas inlet through an opening formed in a side wall of the casing for pivotably supporting a second end of the housing;
    a flange member rigidly sleeved on the cylindrical bar of the radiant gas burner and diametrically formed with a pair of openings which are arranged to be pined to lock the radiant gas burner in a first position wherein the burning zone of the radiant gas burner is faced upward and exposed from the the opening of the top wall of the casing and a second position wherein the burning zone is faced downward;
    a control device mounted to a side wall of the casing and having a gas nozzle pointing to an inlet opening of the gas inlet of the radiant gas burner and a knob for regulating a gas flow rate in the gas nozzle;
    an ignition device mounted to the interior of the casing and arranged close to the burning zone for lighting the radiant gas burner; and
    a collapsible stand including a plurality of legs and collapsible brace members for interconnecting each pair of adjacent legs, top ends of the legs being slidable along the four corners of the casing to be engaged in the hook-shaped fasteners when said stand is erected, said stand being collapsible when said casing is detached from said casing.

* * * * *